No. 840,940. PATENTED JAN. 8, 1907.
F. C. HOWE.
SCOOP.
APPLICATION FILED MAY 23, 1906.
2 SHEETS—SHEET 1.
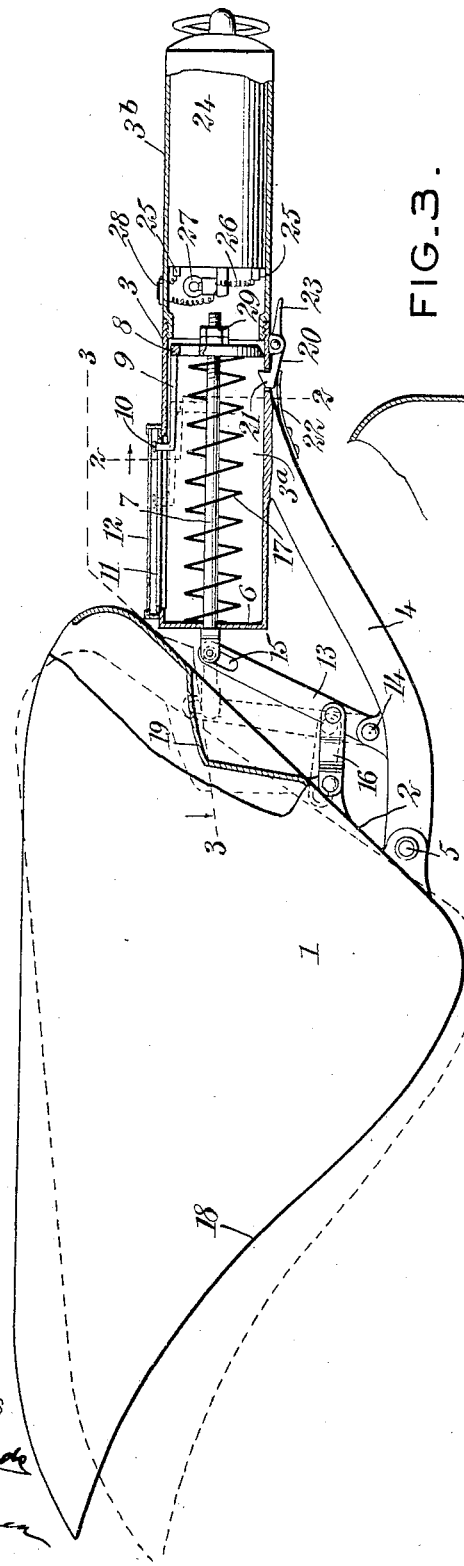
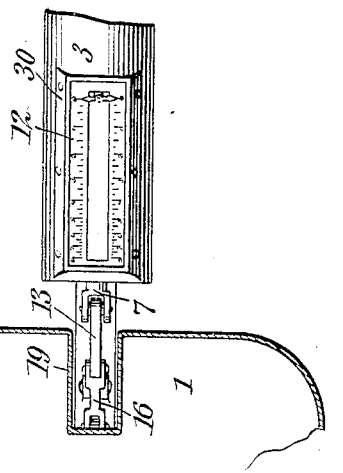
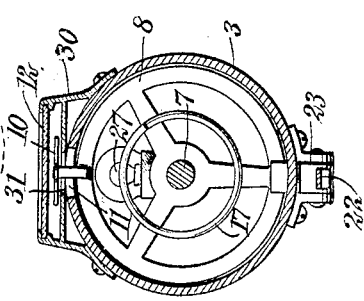
WITNESSES
INVENTOR
Frank C. Howe
BY Munn & Co
ATTORNEYS
THE NORRIS PETERS CO., WASHINGTON, D. C.

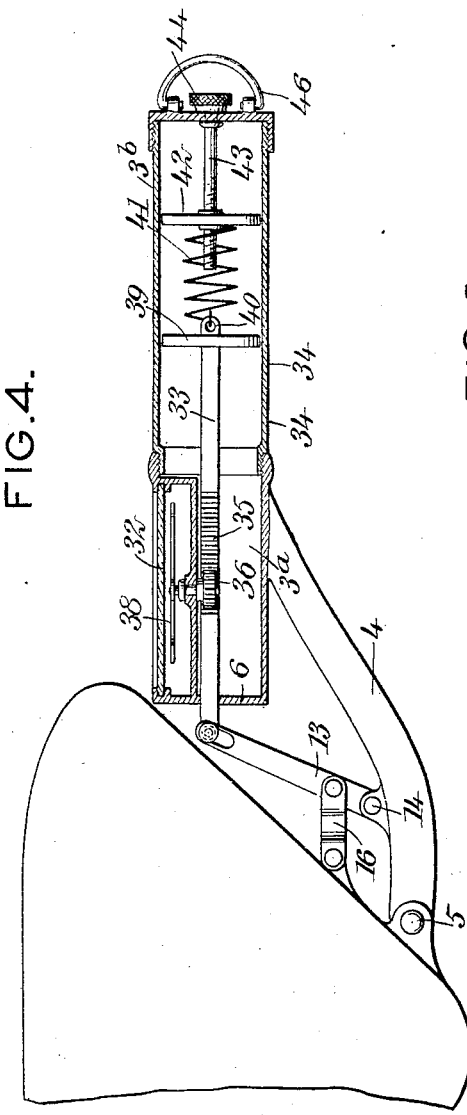
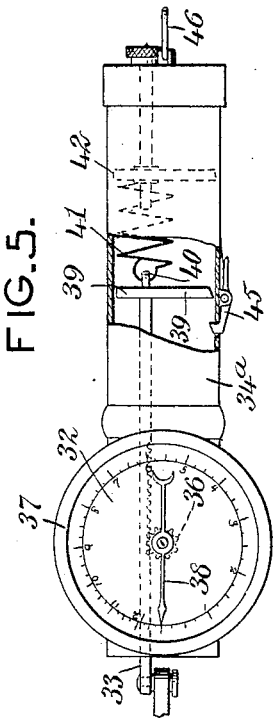

UNITED STATES PATENT OFFICE.

FRANK C. HOWE, OF EL PASO, TEXAS.

SCOOP.

No. 840,940.　　　Specification of Letters Patent.　　　Patented Jan. 8, 1907.

Application filed May 23, 1906. Serial No. 318,321.

*To all whom it may concern:*

Be it known that I, FRANK C. HOWE, a citizen of the United States, and a resident of El Paso, in the county of El Paso and State of Texas, have invented a new and Improved Scoop, of which the following is a full, clear, and exact description.

This invention relates to scoops such as used in stores and similar places in selling food products, such as flour, sugar, &c.

The object of the invention is to produce a scoop of simple construction provided with means for weighing the contents of the scoop, the general purpose of the invention being to do away with the necessity for placing the substance within the scoop in a scale for weighing the same.

Further objects of the invention will appear more fully hereinafter.

The invention consists in the construction and combination of parts to be more fully described hereinafter and particularly set forth in the claims.

Reference is to be had to the accompanying drawings, forming a part of this specification, in which similar characters of reference indicate corresponding parts in all the views.

Figure 1 is a side elevation of a scoop constructed according to my invention, a portion of the scoop being shown in cross-section, together with the principal portion of the handle therefor. Fig. 2 is a cross-section taken on the line 2 2 of Fig. 1. Fig. 3 is a section on the line 3 3 of Fig. 1. Fig. 4 is a view showing a portion of the scoop in side elevation and showing a modified construction for the handle, which is shown in longitudial section; and Fig. 5 is a plan of the handle shown in Fig. 4, a portion of said handle being broken away and shown in cross-section.

Referring more particularly to the parts, 1 represents the body or pan of the scoop, which is preferably of substantially the form shown, presenting an inclined wall 2 adjacent to the tubular handle 3, which handle is attached to the said wall by means of an integral arm 4, extending down from the handle. The body 1 of the scoop is pivotally attached at 5 to the extremity of this arm. The handle 3 is disposed substantially horizontally from the body 1 when the body is held in an upright position, as shown in Fig. 1. The inner extremity of the handle is formed with a head 6, through which an opening is formed which constitutes a guide for a runner 7, which runner consists simply of a piston or rod having a head 8 attached to the inner extremity thereof. This head 8 is formed with an arm 9, carrying a pointer 10. The extremity of the arm 9 projects upwardly and passes through a slot 11, formed in the side of the handle, at which point the pointer 10 is carried, as indicated. Over the slot 11 on the outer side of the handle I provide a scale 12, which is formed on glass, and this scale coöperates with the pointer in order to indicate the weight of a quantity of material held in the body of the scoop. In order to connect the body 1 of the pan with the runner 7, I provide a lever 13, which is pivotally attached at 14 near its lower end to the upper side of the arm 4 and near its other extremity is provided with a slot 15, through which it is pivoted upon the adjacent extremity of the runner 7, as shown. Near the lower extremity of the lever 13 one end of a link 16 is pivoted and at its other end is pivotally connected with the adjacent side of the body of the scoop. Upon the body of the runner 7 a coiled or helical spring 17 is mounted, which thrusts at opposite ends against the head 6 and the head 8. From this arrangement it should be understood that when a quantity of any material is held in the body of the scoop there is a tendency for the scoop to tip downwardly toward its outer extremity, it rocking upon the pivot-pin 5. This tendency to move is resisted by the spring 17, which, it should be understood, is a compression-spring, and this spring will be shortened proportionately with the load. In this connection attention is called to the form of the outer wall 18 of the scoop, which is such as to insure that the locus of the center of gravity of the weight in the scoop will be a substantially vertical line. In this way the accuracy of the scoop is enhanced, it being understood that before the scale is read the scoop will be shaken so that the upper surface of the material is disposed in a substantially horizontal plane. It should be understood that as the scoop tips outwardly in the manner suggested the lever 13 rocks toward the scoop, so that the parts tend to assume the position in which they are indicated in dotted outline in Fig. 1.

In order to make the construction compact, I prefer to place the lever 13 very close to the wall 2 of the scoop, and for this reason it is necessary to provide a recess 19 in this wall to receive the end of the lever 13 as it moves forwardly. The tubular handle 3 is preferably formed in two sections 3ª and 3ᵇ, the latter of which screws into the former so as to be removable. Near the outer extremity of the inner handle-section 3ª a catch 20 is provided, which has a nib 21, which projects through an opening in the under side of the handle, being normally held in this position by means of a small leaf-spring 22, attached to the arm 4, as shown. This catch has a rearwardly-projecting toe 23, which is adapted to be pressed by the finger, so as to withdraw the nib 21 from the interior of the handle, as will be readily understood. The forward face of this nib 21 is preferably inclined, as shown. The function of this catch 20 is to act as a stop, so as to hold the head 8 in substantially the position in which it is shown in full lines in Fig. 1. In this connection it should be understood that the outward movement of the head in the handle is prevented by the inwardly-projecting nib 21. In this way the handle affords means for holding the scoop in a substantially fixed position when the material is being received therein in any manner, as by digging into the contents of a box or barrel. When the contents of the scoop is to be weighed, by pressing one's finger on the toe 23 the head 8 will be released so as to permit the spring 17 to be compressed. The amount of compression of the spring is of course proportionate to the weight in the scoop and is indicated on the scale 12.

The outer handle-section 3ᵇ constitutes a case for an electric generator, such as a dry cell 24, the terminals 25 of the said cell being connected through a circuit 26 with an electric light 27, said circuit being closed by means of a push-button 28. This button is in a convenient point to be pressed by one's thumb. By providing the light 27 the usefulness of the scoop is much enhanced in the dark, as the light is reflected forwardly in the tubular handle is such a way that the reading of the scale may be readily discerned.

As indicated most clearly in Fig. 1, I provide adjusting-nuts 29, which are attached to the threaded extremity of the runner 7, and these nuts afford means for adjusting the degree of compression of the spring 17 when necessary. As indicated most clearly in Fig. 2, the scale 12 is preferably mounted in a suitable frame 30, which is attached over the slot 11 aforesaid and is itself provided with a longitudinal slot 31, which substantially registers with the slot 11 and through which the aforesaid lateral extension of the arm 9 projects.

Instead of providing the construction shown in Fig. 1 I may use a circular dial 32, as indicated in Figs. 4 and 5, for indicating the weight in the body of the scoop. When adopting this construction, I replace the runner 7 with a runner 33, guided longitudinally through the tubular handle 34, the said runner being provided on its side face with rack-teeth 35, which mesh with a pinion 36, mounted centrally in a needle-case 37, which needle-case is preferably formed in the handle, as shown. The pinion 36 is rigid with the needle 38, which coöperates with the dial 32. The manner of attaching the handle to the body of the scoop is substantially the same as that described above. The extremity of the runner 33 beyond the dial is attached to a head 39, which head slides longitudinally in the handle. On the outer side of the head a lug 40 is provided, to which a helical or coiled spring 41 is attached, the outer extremity of this spring being attached to an adjusting-head 42, the said adjusting-head being mounted upon a threaded adjusting-screw 43. This adjusting-screw carries a rigid thumb-head 44 in the end of the handle, which is adapted to be turned in order to adjust the tension of the spring. The spring in this case is evidently a tension-spring and not a compression-spring, as in the former case.

The tubular handle 34 preferably forms a removable section 34ª, which screws into the body of the handle, as shown, the body of the handle being formed integral with the arm which connects the same with the body of the scoop. As indicated in Fig. 5, a catch 45 is provided, which has a nib which projects through the wall of the handle into the interior thereof, the said nib coöperating with the head 39 in the same manner as the nib 21 was described as coöperating with the head 8 aforesaid. As indicated also in Fig. 5, the spring 41 is mounted in the tubular handle in an eccentric position, so that its axis is in substantial alinement with the axis of the runner 33. This arrangement increases the accuracy of the device, as the pull upon the runner is applied directly on the axis of the spring.

With both forms of the device the outer end of the handle may be provided with a loop or hanger 46, formed of suitable wire, which enables the device to be suspended from a nail or similar support when not in use.

Having thus described my invention, I claim as new and desire to secure by Letters Patent—

1. In a device of the class described, in combination, a pan, a handle movably attached thereto, a second member movably attached on said pan, a spring in connection with said last member and adapted to be distorted by a weight in said pan, and means for locking said second member with respect to said handle.

2. In a device of the class described, in combination, a pan, a handle pivotally attached to said pan, a runner guided in said handle and connected with said pan, a scale coöperating with said runner, and means for locking said runner to said handle.

3. In a device of the class described, in combination, a pan, a handle attached thereto, weighing mechanism carried by said handle and controlled by said pan, said weighing mechanism including a translucent scale, and a light supported on said handle and affording means for rendering said scale visible in the dark.

4. In a device of the class described, in combination, a pan, a handle movably attached to said pan, a runner connected with said pan and guided within said handle, said handle having a slot in the wall thereof, a translucent scale over said slot, a pointer running in said slot and controlled by said runner, and a light within said tubular handle.

5. In a device of the class described, in combination, a pan, a handle having an arm rigid therewith and pivotally attached to said pan, a lever attached to said arm, a link connecting said lever with said pan, a runner running upon said handle and connected with said lever, a spring coöperating with said runner, and a scale for indicating the weight held in said pan and also coöperating with said runner.

6. In a device of the class described, in combination, a pan, a handle having an arm pivotally attached to said pan, a runner guided in said handle, a spring mounted in said handle and coöperating with said runner, a connection from said runner to said pan, a scale coöperating with said runner, a head carried by said runner, and a catch coöperating with said head to substantially fix the same with respect to said handle.

In testimony whereof I have signed my name to this specification in the presence of two subscribing witnesses.

FRANK C. HOWE.

Witnesses:
JOHN F. MITCHELL,
ROBERT C. WALSHE.